(12) United States Patent
Yoneda et al.

(10) Patent No.: US 7,981,976 B2
(45) Date of Patent: Jul. 19, 2011

(54) HEAT-CURABLE POLYIMIDE SILICONE RESIN COMPOSITION

(75) Inventors: Yoshinori Yoneda, Annaka (JP); Michihiro Sugo, Annaka (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 317 days.

(21) Appl. No.: 12/230,773

(22) Filed: Sep. 4, 2008

(65) Prior Publication Data

US 2009/0062480 A1 Mar. 5, 2009

(30) Foreign Application Priority Data

Sep. 5, 2007 (JP) .................. 2007-230203

(51) Int. Cl.
*C08G 77/455* (2006.01)
(52) U.S. Cl. .......................... 525/474; 528/24
(58) Field of Classification Search .................. 525/474; 528/24
See application file for complete search history.

(56) References Cited

U.S. PATENT DOCUMENTS

| | | |
|---|---|---|
| 4,480,009 A | 10/1984 | Berger |
| 4,650,849 A | 3/1987 | Nishimura et al. |
| 4,829,131 A | 5/1989 | Lee |
| 4,853,452 A | 8/1989 | Lee |
| 2004/0265731 A1 | 12/2004 | Okada et al. |

FOREIGN PATENT DOCUMENTS

| | | |
|---|---|---|
| JP | 2-036232 A | 2/1990 |
| JP | 2-147630 A | 6/1990 |
| JP | 07 268098 | 10/1995 |
| JP | 8-218034 A | 8/1996 |
| JP | 2006-269250 A | 10/2006 |

OTHER PUBLICATIONS

JP 2006 269250 machine translation.*
Extended European Search Report issued in corresponding European Application No. 08163820.7 dated Sep. 4, 2009.

* cited by examiner

*Primary Examiner* — Kuo-Liang Peng
(74) *Attorney, Agent, or Firm* — Birch, Stewart, Kolasch & Birch, LLP

(57) ABSTRACT

A heat-curable polyimide silicone resin composition comprising 100 parts by weight of a polyimide silicone resin having a radically polymerizable group bonded to a silicon atom, 0.1 to 20 parts by weight of a peroxycarbonate curing agent, and a solvent. The composition can be cured at a low temperature in a short time.

4 Claims, No Drawings

HEAT-CURABLE POLYIMIDE SILICONE RESIN COMPOSITION

CROSS REFERENCE

This application claims benefit of Japanese Patent application No. 2007-230203 filed on Sep. 5, 2007, the contents of which are hereby incorporated by reference.

FIELD OF THE INVENTION

The present invention relates to a heat-curable polyimide silicone resin composition comprising a polyimide silicone resin having a radically polymerizable group. The resin, in combination with a specific curing agent, can be cured by heating at a lower temperature for a shorter period of time than a conventional composition, and forms a film or coating which has heat resistance, mechanical strength, flexibility, solvent resistance and adhesion strength to various kinds of substrates.

BACKGROUND OF THE INVENTION

A polyimide resin is excellent in heat resistance and electric insulation, so that it has various applications, for example, printed wiring board, heat resistant adhesive tape, electrical parts, protective layer for semiconductor devices, and interlayer dielectric film. However, the polyimide resin dissolves in a limited number of organic solvents, causing difficulty in handling in some applications. For easy handling, a polyamic acid, which is a polyimide precursor and more soluble in various kinds of organic solvents than a polyimide resin, is applied on a substrate and then heated at a high temperature for a long period of time to be imidized by dehydration and cyclization into a polyimide. This imidization of the polyamic acid to a polyimide requires a long time of heating at a high temperature, which tends to degrade the substrate. Insufficient heating, on the other hand, causes a portion of the polyamic acid to remain, which degrades moisture resistance and corrosion resistance of the polyimide.

In place of the polyamic acid, the invention described in Japanese Patent Application Laid-open No. H02-36232 employs an organic-solvent soluble polyimide resin, and a polyimide resin film is made by applying a solution of the organic-solvent soluble polyimide resin on a substrate and heating it to evaporate the solvent. However, the film obtained from the polyimide resin does not have good solvent resistance.

Japanese Patent Applications Laid-open No. H02-147630 and No. H07-268098 describe heat-curable polyimide silicones which have polymerizable side chains and are soluble in an organic solvent. The polyimide silicone described in H02-147630 can be cured either by heat or light. The polyimide silicone described in No. H07-268098 is cured by hydrosilylation of an organohydrogensiloxane. The hydrosilylation, however, takes five hours.

SUMMARY OF THE INVENTION

An object of the present invention is to provide a polyimide silicone resin composition which can be cured at a lower temperature for a shorter period of time than conventional compositions.

As a result of extensive studies, the present inventors have found that the above object can be achieved by using a polyimide silicone resin having a radically polymerizable silicone in combination of a specific curing agent.

The present invention is a heat-curable polyimide silicone resin composition, said composition comprising
100 parts by weight of a polyimide silicone resin having a radically polymerizable group bonded to a silicon atom,
0.1 to 20 parts by weight of a peroxycarbonate curing agent, and a solvent.

The present composition is in the form of a solution, so that it is easy to handle. It can form a cured film by heating at a relatively lower temperature for a relatively shorter period of time. The cured film obtained has heat resistance, mechanical strength, solvent resistance and adhesion strength to various kinds of substrates.

DESCRIPTION OF THE PREFERRED EMBODIMENTS

In the composition of the present invention, the radically polymerizable groups bonded to silicon atoms of the polyimide silicone polymerize in the presence of peroxycarbonate curing agent, whereby curing at a low temperature in a short time is achieved. Examples of the radically polymerizable groups include vinyl, propenyl, (meth)acryloyloxypropyl, (meth)acryloyloxyethyl, (meth)acryloyloxymethyl, and stryl groups, among which vinyl group is preferred because of good availability of a raw material. The radically polymerizable group may be bonded to any silicon atom, either terminal one or middle one, of a silicone backbone of the polyimide silicone resin.

Examples of the peroxycarbonate used in the present invention include monoperoxycarbonate such as t-butyl peroxyisopropyl carbonate, t-butyl peroxy-2-ethylhexyl carbonate, t-amylperoxy-2-ethylhexyl carbonate; and peroxydicarbonates such as di(2-ethylhexyl)peroxydicarbonate, 1,6-bis(t-butylperoxycarbonyloxy)hexane, bis(4-t-butyl cyclohexyl)peroxydicarbonate, di(2-ethoxyethyl)peroxydicarbonate, di(n-propyl)peroxydicarbonate, and diisopropyl peroxydicarbonate. Among these, t-butyl peroxy 2-ethylhexyl carbonate, t-amyl peroxy 2-ethylhexyl carbonate, 1,6-bis(t-butyl peroxy carbonyloxy)hexane, bis(4-t-butyl cyclohexyl)peroxydicarbonate are preferred. The peroxycarbonate has a good compatibility with the polyimide resin in the present composition to achieve fast curing at a low temperature.

The peroxycarbonate is contained in the composition in an amount of from 0.1 to 20 parts by weight, preferably from 1 to 10 parts by weight per 100 parts by weight of the polyimide silicone resin. If it is contained in an amount more than the aforesaid upper limit, storage stability of a composition tends to be low and a cured film from such a composition shows degraded heat and humidity resistance. On the other hand, a composition comprising the peroxycarbonate in an amount less than the aforesaid lower limit tends to give a cured film which has poor solvent resistance.

The solvent used in the present invention dissolve the polyimide silicone resin and the peroxycarbonate. Examples of the preferred solvents include ethers such as tetrahydrofuran and anisole; ketone solvents such as cyclohexanone, 2-butanone, methyl isobutyl ketone, 2-heptanone, 2-octanone, and acetophenone; ester solvents such as butyl acetate, methyl benzoate, and γ-butyrolactone; cellosolve solvents such as butyl cellosolve acetate and propylene glycol monomethyl ether acetate; amide solvents such as N,N-dimethylformamide, N,N-dimethylacetamide, N-methyl-2-pyrrolidone; and aromatic hydrocarbon solvents such as toluene and xylene, among which ketone solvents, ester solvents, cellosolve solvents and mixtures thereof are particularly preferred. A content of the solvent in the composition is preferably adjusted according to solubility of the resin, workability of application of the composition, and an aimed film thickness. Usually, the content is such that a concentration of the polyimide silicone resin ranges from 1 to 50 wt %. The concentration of the polyimide silicone resin may be higher in the composition which is diluted just before it is applied to a substrate.

Preferably, the present polyimide silicone resin is composed of two types of repeating units of the following formulas (1-1) and (1-2).

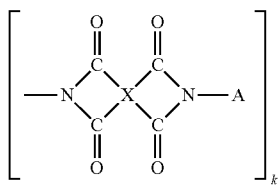
(1-1)

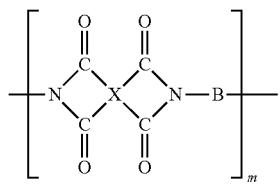
(1-2)

The above formula is a compositional formula, that is, k and m are numbers representing a molar ratio of the repeating units (1-1) and (1-2), respectively. In the formulas (1-1) and (1-2), k and m meets $0 \leq k \leq 1$ and $0 < m \leq 1$ with k+m being 1. As explained below, B is a silicone residue comprising a radically polymerizable group. The repeating units may be bonded in blocks or randomly.

In the above formula, X is independently selected from the following groups.

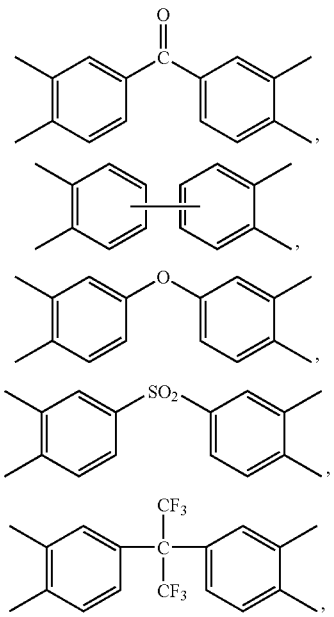

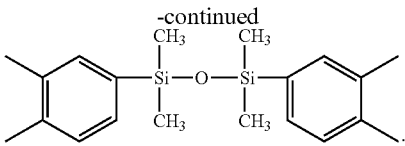

In the formula (1-1), A is a divalent group represented by the following formula (2)

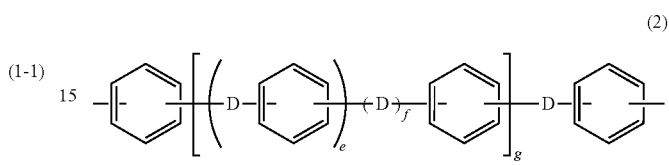
(2)

wherein D may be the same with or different from each other and is one of the divalent groups shown below, and e, f, g are 0 or 1.

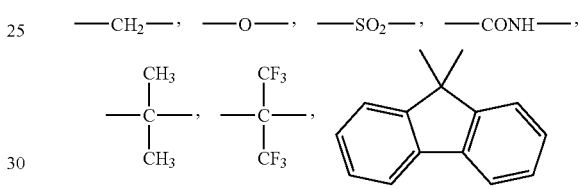

Examples of A of the formula (2) include following groups.

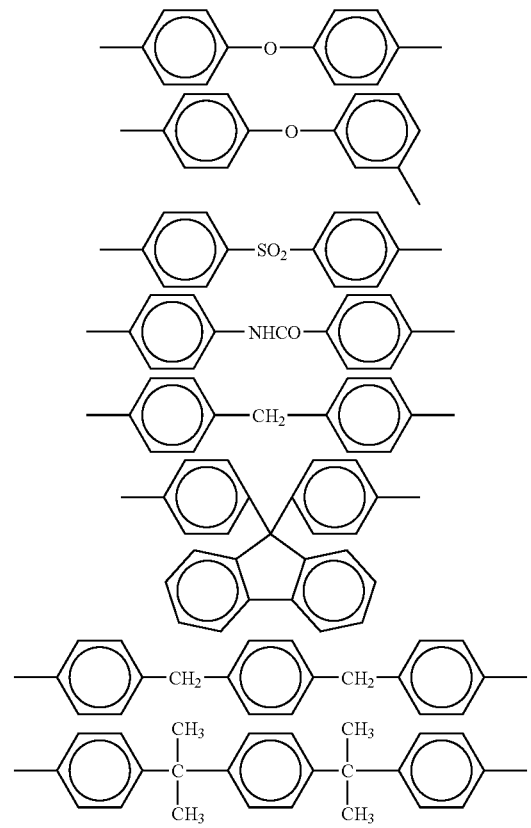

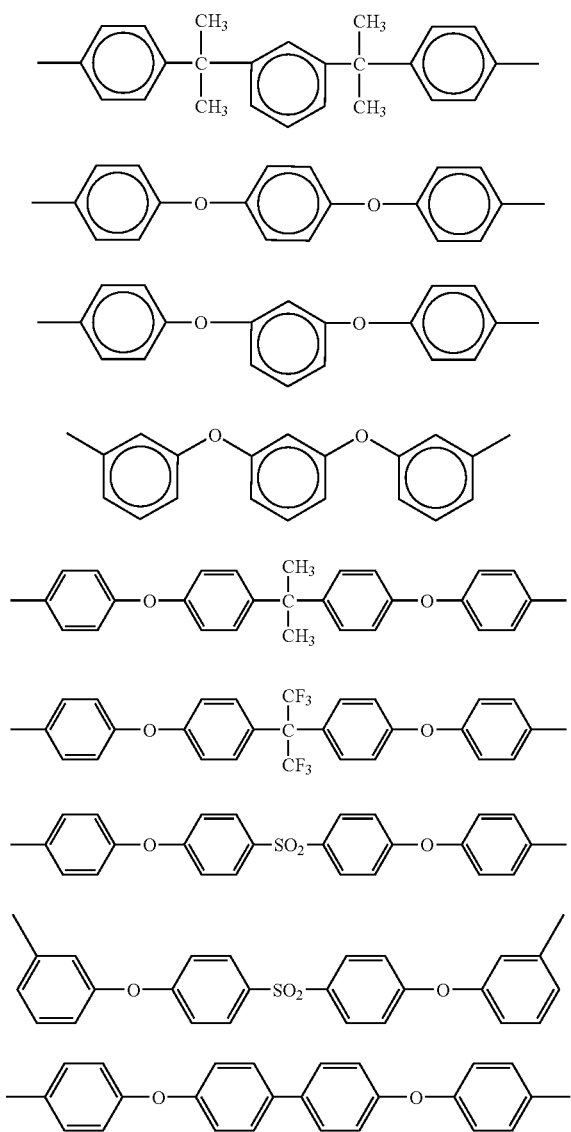

In the formula (1-2), B is represented by the following formula (3),

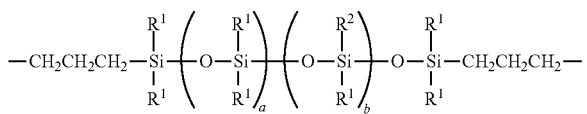

wherein $R^1$ may be the same with or different from each other and is a substituted or unsubstituted monovalent hydrocarbon group having 1 to 8 carbon atoms. Examples of $R^1$ include alkyl groups such as methyl, ethyl, propyl, butyl, pentyl and hexyl groups; alicyclic groups such as cyclopentyl, and cyclohexyl groups; aryl groups such as a phenyl group; aralkyl groups such as benzyl, and phenetyl groups. Among these groups, methyl, ethyl, and phenyl groups are preferred because of good availability of corresponding raw materials. $R^2$ is the aforesaid radically-polymerizable group.

In the formula (3), a is an integer of from 0 to 100, preferably from 3 to 70, and b is an integer of from 1 to 100, preferably from 3 to 70, more preferably from 5 to 50.

The present polyimide silicone resin has a weight average molecular weight, reduced to polystyrene, determined by gel permeation chromatography (GPC) of from 5,000 to 150,000, preferably from 8,000 to 100,000. A polyimide silicone resin having a molecular weight smaller than the aforesaid lower limit tends to form a cured coating which is not mechanically strong. A polyimide silicone resin having a molecular weight larger than the aforesaid upper limit is difficult to dissolve in a solvent, causing difficulty in handling.

The present polyimide silicone resin can be prepared by a known method. Firstly, an acid anhydride to derive X, a diamine to derive A, and a diaminopolysiloxane to derive B are dissolved in a solvent and subjected to a reaction at a low temperature of from 20 to 50° C. to form a polyamic acid. Then, the polyamic acid solution thus obtained is heated to a temperature preferably of from 80 to 200° C., more preferably from 140 to 180° C., to form a solution of a polyimide silicone resin by dehydration cyclization between an acid group and an amide group of the polyamic acid. Subsequently, the solution is poured in a poor solvent such as water, methanol, ethanol or acetonitrile to form a precipitate of the reaction product. By drying the precipitate, the polyimide silicone resin is obtained.

A total molar ratio of the diamine and the diaminopolysiloxane to the tetracarboxylicc acid anhydride ranges from 0.95 to 1.05, preferably from 0.98 to 1.02. The solvent used for preparation of the polyimide silicone resin may be N-methyl-2-pyrrolidone, cyclohexanone, γ-butyrolactone, N,N-dimethylacetamide or a mixture of these solvents.

By using an aromatic hydrocarbon such as toluene and xylene together with the aforesaid solvent, water produced in the dehydration reaction can be removed easily by azeotropic distillation.

In order to control a molecular weight of the polyimide silicone resin, it is possible to add a mono-functional acid anhydride such as phthalic anhydride or a mono-functional amine compound, such as aniline. In that case, the mono-functional compound may be used preferably in an amount of 10 mole % or less of the polyimide silicone resin.

Alternatively, the imidization can be achieved by using dehydration agent and a imidization catalyst, and then heating the reaction mixture to a temperature of about 50° C. Examples of the dehydration agent include acid anhydrides such as acetic acid anhydride, propionic acid anhydride, and trifluoroacetic acid anhydride. The dehydration agent is used preferably in an amount of from 1 to 10 moles per mole of diamine.

Examples of the imidization catalyst include tertiary amines such as pyridine, collidine, lutidine, and triethylamine. The catalyst is used in an amount preferably of from 0.5 to 10 moles per mole of the dehydration agent.

When two or more of diamine and/or tetracarboxylic acid anhydride are used, the diamines and/or tetracarboxylic acid anhydrides can be premixed and subjected to the reaction all together, or added sequentially and subjected to the reaction sequentially.

Examples of the acid dianhydride to drive X include 3,3', 4,4'-diphenylsulphonetetracarboxylic dianhydride, 3,3',4,4'-biphenyltetracarboxylic dianhydride, 2,3',3,4'-biphenyltetracarboxylic dianhydride, 5-(2,5-dioxotetrahydro-3-furanyl)-3-methyl-3-cyclohexene-1,2-dicarboxyl dianhydride, 4-(2,5- dioxotetrahydrofuran-3-yl)-1,2,3,4-tetrahydronaphthalene-1,2-dicarboxylic dianhydride, 1,2,3,4-butanetetracarboxylic dianhydride, 3,3',4,4'-benzophenonetetracarboxylic dianhydride, 4,4'-hexafluoropropylidenebisphthalic dianhydride, 2,2-bis(p-trimethoxyphenyl)propane, 1,3-tetramethyldisiloxanebisphthalic dianhydride, and 4,4'-oxydiphthalic dianhydride.

Examples of the diamine to derive A include 4,4'-diaminobenzanilide, 4,4'-diaminodiphenylether, 3,4'-diaminodiphenylether, 4,4'-diaminodiphenylsulphone, 3,3'-dimethyl-4,4'-diaminobiphenyl, 4,4'-(p-phenylenediisopropylidene)dianiline, 4,4'-(m-phenylenediisopropylidene)dianiline, 1,3-bis(4-aminophenoxy)benzene, 1,4-bis(4-aminophenoxy)benzene, 1,3-bis(3-aminophenoxy)benzene, 2,2-bis[4-(4-aminophenoxy)phenyl]propane, 2,2-bis[4-(4-aminophenoxy)phenyl]hexafluoropropane, bis[4-(4-aminophenoxy)phenyl]sulphone, bis[4-(3-aminophenoxy)phenyl]sulphone, 4,4'-bis(4-aminophenoxy)biphenyl, and 9,9-bis(4-aminophenyl)fluorene.

Diaminopolysiloxane to derive B may be a diaminopolysiloxane having amino groups bonded to the both end of the diaminopolysiloxane residue represented by the formula (3).

The present composition may be prepared by mixing the polyimide silicone resin, the peroxycarbonate, and the solvent by a known method such as mixing with a mixer. The composition can comprise a conventionally used additive such as a silane coupling agent to improve adhesion strength of the composition to a substrate.

A cured film of the composition can be formed by applying the composition to a substrate, and then heating the applied composition at a temperature of about 80 to 200° C. for 0.5 and 2 hours. When the composition contains the solvent having a low boiling point, the heating may be performed after removing the solvent.

The composition is advantageously used for a substrate which has relatively poor heat resistance and deforms by heat. Further, the curing requires no special instrument for irradiating light. The composition thus has good handling property and can contribute to save power.

EXAMPLES

The present invention is explained with reference to the following Examples, but not limited thereto.

Synthesis Example 1

Synthesis of a Polyimide Silicone Resin

In a flask provided with a stirrer, a thermometer, and nitrogen purge equipment, 71.6 g (0.2 mole) of 3,3',4,4'-diphenylsulfone tetracarboxylic acid anhydride, and 350 g of cyclohexanone were placed. In the flask, a solution of 87.6 g (0.1 mole) of diamino vinylsiloxane represented by the following formula (4) and 41.1 g (0.1 mole) of 2,2-bis[4-(4-aminophenoxy)phenyl]propane dissolved in 100 g of cyclohexanone was added dropwise while keeping a temperature of the reaction mixture at 50° C. or lower.

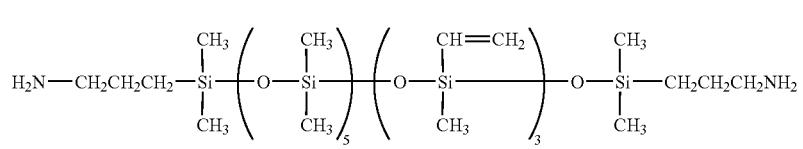

(4)

After the addition was completed, the reaction mixture was stirred at room temperature for another 10 hours. Subsequently, a reflux condenser provided with a water receptor was attached to the flask and, then, 50 g of xylene was added. After the temperature of the reaction mixture was raised to 150° C. and kept at that temperature for 6 hours, a brownish yellow solution was obtained.

The solution thus obtained was cooled to room temperature (25° C.) and then poured in methanol to obtain precipitate. The precipitate was dried and analyzed by IR Spectroscopy. In the spectra obtained, there were not absorption bands of a polyamic acid, and the absorption bands of imide group were observed at 1780 cm$^{-1}$ and 1720 cm$^{-1}$, indicating polyimide silicone resin comprising the following repeating units (5-1) and (5-2), hereinafter referred to as polyimide silicone resin (a).

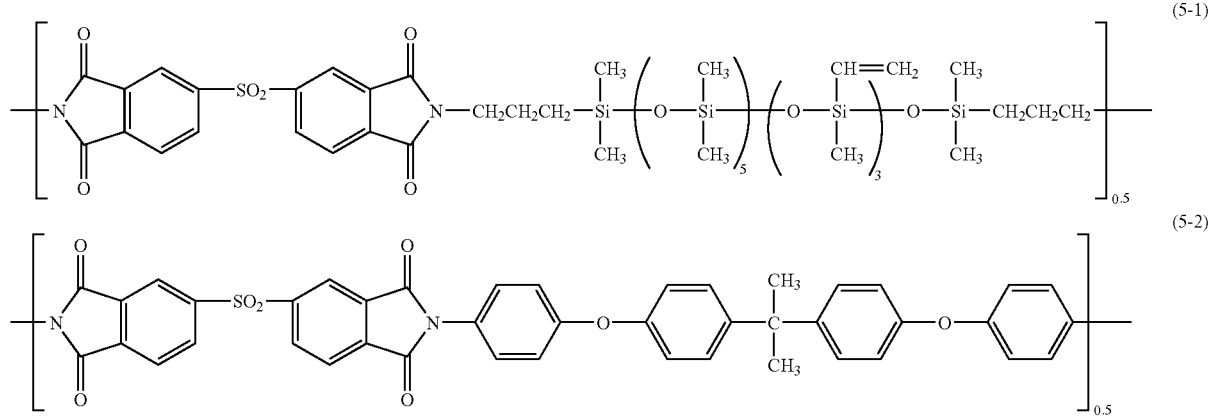

A weight average molecular weight of the resin, reduced to polystyrene, was 34,000, which was determined by gel permeation chromatography (GPC) using tetrahydrofuran as a solvent.

Synthesis Example 2

Synthesis of a Polyimide Silicone Resin

In a flask provided with a stirrer, a thermometer, and nitrogen purge equipment, 88.8 g (0.2 mole) of 4,4'-hexafluoropropylidene bisphthalic acid anhydride, and 500 g of cyclohexanone were placed. In the flask, a solution of 192.2 g (0.06 mole) of diaminovinylsiloxane represented by the following formula (6) and 40.9 g (0.14 mole) of 1,3-bis(3-aminophenoxy)benzene dissolved in 200 g of cyclohexanone was added dropwise while keeping a temperature of the reaction mixture at 50° C. or lower.

A weight average molecular weight of the resin, reduced to polystyrene, was 42,000, which was determined by gel permeation chromatography (GPC) using tetrahydrofuran as a solvent.

Synthesis Example 3

Synthesis of a Polyimide Silicone Resin

In a flask provided with a stirrer, a thermometer, and nitrogen purge equipment, 62.0 g (0.2 mole) of oxydiphthalic acid anhydride, and 400 g of N-methyl-2-pyrrolidone were placed. In the flask, a solution of 102 g (0.06 mole) of diamino vinylsiloxane represented by the following formula (8) and 57.5 g (0.14 mole) of 2,2-bis[4-(4-aminophenoxy)phenyl] propane dissolved in 100 g of cyclohexanone was added dropwise while keeping a temperature of the reaction mixture at 50° C. or lower.

(6)

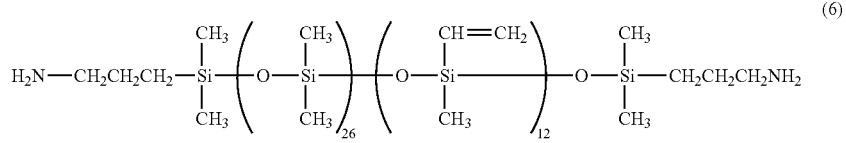

After the addition was completed, the reaction mixture was stirred at room temperature for another 10 hours. Subsequently, a reflux condenser provided with a water receptor was attached to the flask and, then, 70 g of xylene was added. After the temperature of the reaction mixture was raised to 150° C. and kept at that temperature for 6 hours, a brownish yellow solution was obtained.

The solution thus obtained was cooled to room temperature (25° C.) and then poured in methanol to obtain precipitate. The precipitate was dried and analyzed by IR Spectroscopy. In the spectra obtained, there were not absorption bands of a polyamic acid, and the absorption bands of imide group were observed at 1780 cm$^{-1}$ and 1720 cm$^{-1}$, indicating polyimide silicone resin comprising the following repeating units (7-1) and (7-2), hereinafter referred to as polyimide silicone resin (b).

(7-1)

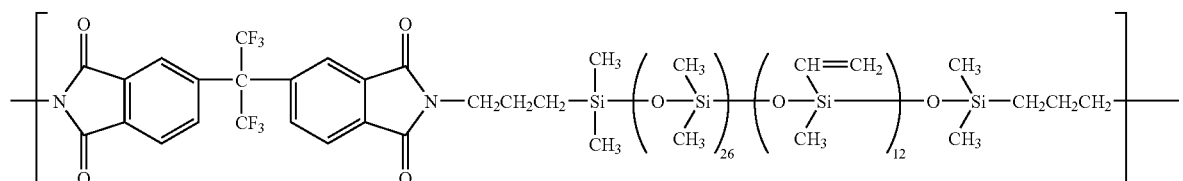

(7-2)

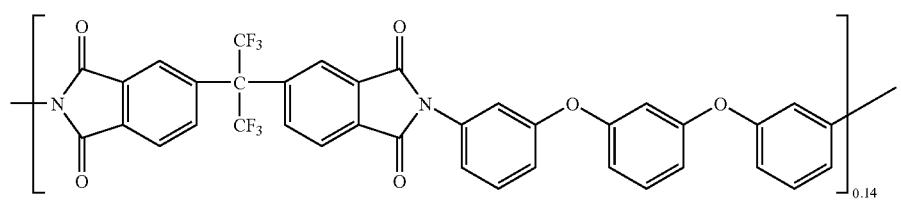

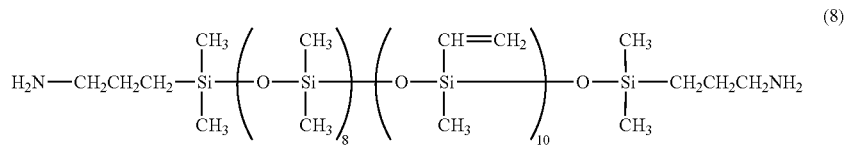

(8)

After the addition was completed, the reaction mixture was stirred at room temperature for another 10 hours. Subsequently, a reflux condenser provided with a water receptor was attached to the flask and, then, 70 g of xylene was added. After the temperature of the reaction mixture was raised to 150° C. and kept at that temperature for 6 hours, a brownish yellow solution was obtained.

The solution thus obtained was cooled to room temperature (25° C.) and then poured in methanol to obtain precipitate. The precipitate was dried and analyzed by IR Spectroscopy. In the spectra obtained, there were not absorption bands of a polyamic acid, and the absorption bands of imide group were observed at 1780 $cm^{-1}$ and 1720 $cm^{-1}$, indicating polyimide silicone resin comprising the following repeating units (9-1) and (9-2), hereinafter referred to as polyimide silicone resin (c).

anone were placed. In the flask, a solution of 84.0 g (0.6 mole) of diaminosiloxane represented by the following formula (10) and 50 g (0.1 mole) of 2,2-bis[4-(4-aminophenoxy)phenyl]propane dissolved in 100 g of cyclohexanone was added dropwise while keeping a temperature of the reaction mixture at 50° C. or lower.

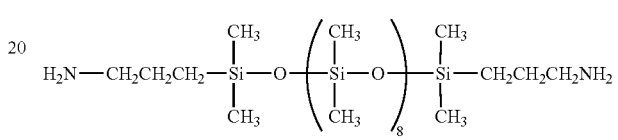

(10)

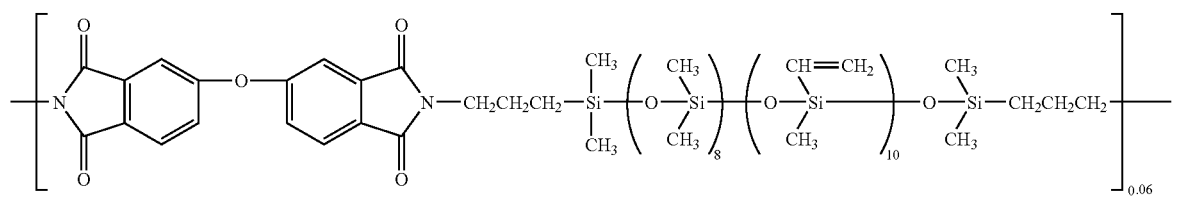

(9-1)

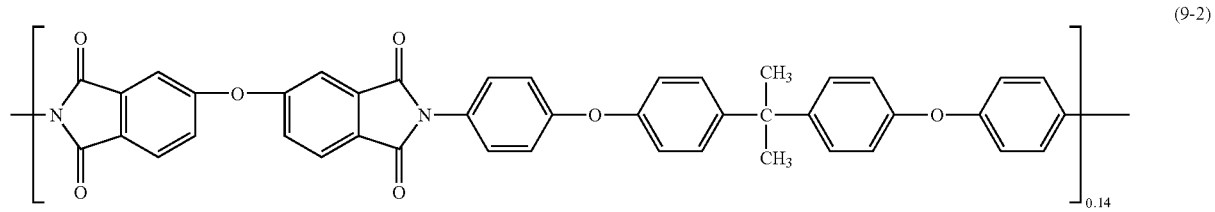

(9-2)

A weight average molecular weight of the resin, reduced to polystyrene, was 35,000, which was determined by gel permeation chromatography (GPC) using tetrahydrofuran as a solvent.

Synthesis 4

Synthesis of a Comparative Polyimide Silicone Resin

For a comparative example, a polyimide silicone resin having no radically polymerizable group was prepared. In a flask provided with a stirrer, a thermometer, and nitrogen purge equipment, 71.6 g (0.2 mole) of 3,3',4,4'-diphenylsulfonetetracarboxylic acid anhydride, and 350 g of cyclohex- After the addition was completed, the reaction mixture was stirred at room temperature for another 10 hours. Subsequently, a reflux condenser provided with a water receptor was attached to the flask and, then, 50 g of xylene was added. After the temperature of the reaction mixture was raised to 150° C. and kept at that temperature for 6 hours, a brownish yellow solution was obtained.

The solution thus obtained was cooled to room temperature (25° C.) and then poured in methanol to obtain precipitate. The precipitate was dried and analyzed by IR Spectroscopy. In the spectra obtained, there were not absorption bands of a polyamic acid, and the absorption bands of imide group were observed at 1780 $cm^{-1}$ and 1720 $cm^{-1}$, indicating polyimide silicone resin comprising the following repeating units (11-1) and (11-2), hereinafter referred to as polyimide silicone resin (d).

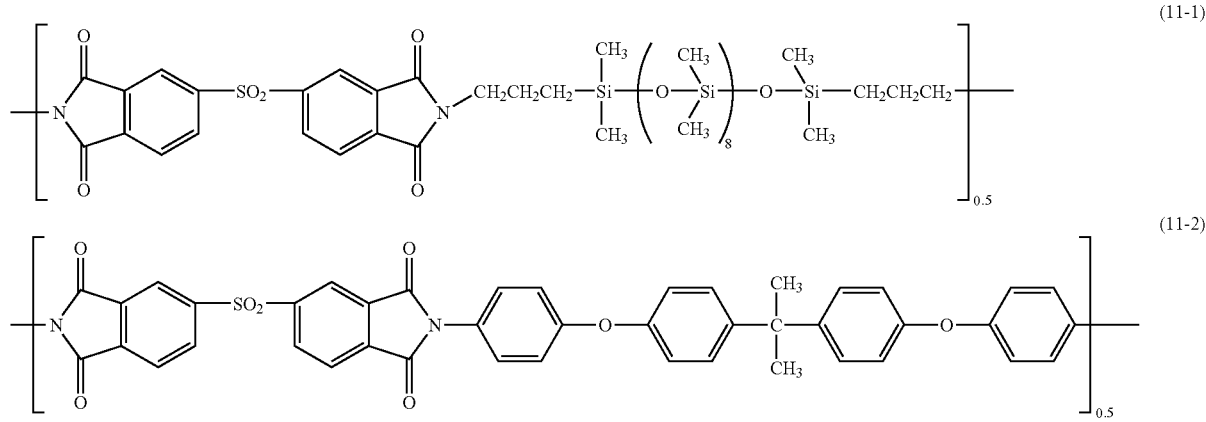

A weight average molecular weight of the resin, reduced to polystyrene, was 30,000, which was determined by gel permeation chromatography (GPC) using tetrahydrofuran as a solvent.

Preparation of Compositions

Compositions were prepared according to the formulations shown in Table 1. In Table 1, "parts" means "parts by weight", and the curing agents indicated with roman numerals are as shown below.
(I) t-butylperoxy-2-ethylhexyl carbonate
(II) 1,6-bis(t-butylperoxycarbonyloxy)hexane
(III) t-amylperoxy-2-ethylhexyl carbonate
(IV) bis(4-t-butylcyclohexyl)peroxydicarbonate
(V) 1,1-bis(t-butylperoxy)-3,3,5-trimethylcyclohexane
(VI) cyclohexanone peroxide
(VII) benzoyl peroxide
(VIII) t-butyl peroxy acetate
(IX) 1,1,3,3-tetramethylbutylhydro peroxide Preparation of a Cured Film and Evaluation of the Film (1) Solvent Resistance A composition prepared was applied to a plate coated with a fluororesin in such an amount that a thickness of the composition after dried was about 0.1 mm. The dried film was heated at 80° C. for 30 minutes and then 150° C. for 1 hour, whereby a cured film of the composition was formed. The cured film was soaked in N-methyl-2-pyrrolidone (NMP). After 30 minutes, the film was taken out and visually observed for damages by swelling and/or dissolving in NMP. The results are as shown in Table 2.

(2) Adhesion Strength

A composition prepared was applied to a copper substrate and then heated at 80° C. for 30 minutes and then a final curing temperature shown in Table 1 for 1 hour, whereby a cured film of the composition was formed. An adhesion strength after keeping the copper substrate with the cured film thereon in a dryer at 150° C. for 360 hours, hereinafter referred to as "heat resistance of adhesion", and an adhesion strength after keeping the copper substrate with the cured film thereon in a saturated water vapor at 120° C. and at 2 atm for 168 hours, hereinafter referred to as "heat and humidity resistance of adhesion" were measured by crosscut adhesion test according to the Japanese Industrial Standards (JIS) K5400. The results are as shown in Table 2, wherein a numerator indicates a number of patches per 100 patches which were not peeled off. For example, 100/100 indicates that no patch was peeled off and 0/100 indicates all of the 100 patches were peeled off.

(3) Mechanical Strength

Compositions of Example 2, Example 4 and Comparative Example 1 were evaluated for mechanical strength. A composition was heated at 80° C. for 30 minutes and then 150° C. for 1 hour to obtain a cured product. Tensile elongation and tensile strength of the cured product were measured according to JIS K7113. The results are as shown in Table 3.

TABLE 1

| | | Formulation | | | | | | Final curing temperature, ° C. |
|---|---|---|---|---|---|---|---|---|
| | | polyimide silicone resin | parts | curing agent | parts | solvent | parts | |
| Examples | 1 | (a) | 100 | I | 1 | methyl ethyl ketone | 200 | 180 |
| | 2 | (a) | 100 | I | 5 | methyl ethyl ketone | 200 | 150 |
| | 3 | (a) | 100 | II | 5 | methyl ethyl ketone | 200 | 100 |
| | 4 | (b) | 100 | II | 3 | butyl acetate | 300 | 150 |
| | 5 | (c) | 100 | I | 5 | cyclohexanone | 150 | 180 |
| | 6 | (a) | 100 | III | 3 | 2-butanone | 150 | 150 |
| | 7 | (a) | 100 | IV | 3 | methyl ethyl ketone | 150 | 150 |
| Comparative Examples | 1 | (a) | 100 | — | — | methyl ethyl ketone | 200 | 150 |
| | 2 | (d) | 100 | I | 10 | methyl ethyl ketone | 200 | 150 |
| Referential Examples | 1 | (a) | 100 | V | 5 | methyl ethyl ketone | 200 | 150 |
| | 2 | (a) | 100 | V | 10 | methyl ethyl ketone | 200 | 150 |

TABLE 1-continued

| | polyimide silicone resin | parts | curing agent | parts | solvent | parts | Final curing temperature, °C. |
|---|---|---|---|---|---|---|---|
| 3 | (a) | 100 | VI | 5 | methyl ethyl ketone | 200 | 150 |
| 4 | (a) | 100 | VI | 10 | methyl ethyl ketone | 200 | 150 |
| 5 | (a) | 100 | VII | 10 | methyl ethyl ketone | 200 | 150 |
| 6 | (a) | 100 | VIII | 10 | methyl ethyl ketone | 200 | 150 |
| 7 | (a) | 100 | IX | 10 | methyl ethyl ketone | 200 | 150 |

TABLE 2

| | | Resistance to NMP | Heat resistance of adhesion | Heat and humidity resistance of adhesion |
|---|---|---|---|---|
| Examples | 1 | Slightly swollen | 100/100 | 100/100 |
| | 2 | No damage | 100/100 | 100/100 |
| | 3 | No damage | 100/100 | 100/100 |
| | 4 | No damage | 100/100 | 100/100 |
| | 5 | No damage | 100/100 | 100/100 |
| | 6 | No damage | 100/100 | 100/100 |
| | 7 | No damage | 100/100 | 100/100 |
| Comparative Examples | 1 | Dissolved | 70/100 | 55/100 |
| | 2 | Dissolved | 60/100 | 60/100 |
| Referential Examples | 1 | Swollen and partly dissolved | 70/100 | 60/100 |
| | 2 | Heavily swollen | 75/100 | 60/100 |
| | 3 | Swollen | 80/100 | 65/100 |
| | 4 | Swollen | 85/100 | 65/100 |
| | 5 | Heavily swollen | 75/100 | 65/100 |
| | 6 | Swollen | 90/100 | 70/100 |
| | 7 | Dissolved | 85/100 | 70/100 |

TABLE 3

| | Tensile elongation, % | Tensile strength, Mpa |
|---|---|---|
| Example 2 | 320 | 18 |
| Example 4 | 420 | 26 |
| Comparative Example 1 | 400 | 10 |

As is found from Table 2, the compositions of Examples comprising the polyimide silicone having radically polymerizable groups and peroxycarbonate is highly curable compared with the comparative compositions having no radically polymerizable group or the curing agent, or referential compositions comprising other peroxides. By heating at a relatively low temperature of from about 150 to 180° C. for a few hours, the present composition forms a cured product which has good solvent resistance, heat resistance and mechanical strength.

INDUSTRIAL APPLICABILITY

The present polyimidesilicone resin composition is useful for electric parts, protective films for semiconductor materials, interlayer dielectric film and adhesive tape.

The invention claimed is:

1. A heat-curable polyimide silicone resin composition comprising 100 parts by weight of a polyimide silicone resin having a radically polymerizable group bonded to a silicon atom, 0.1 to 20 parts by weight of a peroxycarbonate curing agent, and a solvent, wherein the peroxycarbonate curing agent is selected from the group consisting of t-butyl-peroxy-2-ethylhexyl carbonate, t-amylperoxy-2-ethylhexyl carbonate, 1,6-bis(t-butylperoxycarbonyloxy)hexane, and bis(4-t-butylcyclohexyl)peroxydicarbonate.

2. The heat-curable polyimide silicone resin composition according to claim 1, wherein the polyimide silicone resin comprises two types of repeating units of the following formulas (1-1) and (1-2), and has a weight average molecular weight, reduced to polystyrene, of from 5,000 to 150,000,

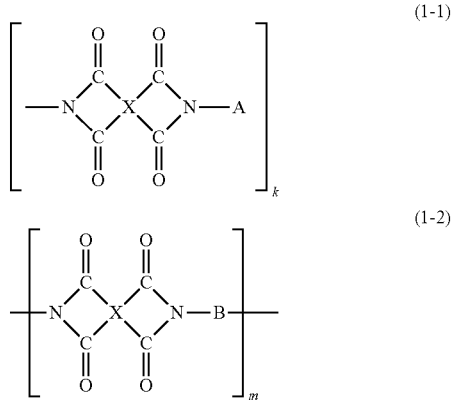

wherein X is a tetravalent group independently selected from the following organic groups,

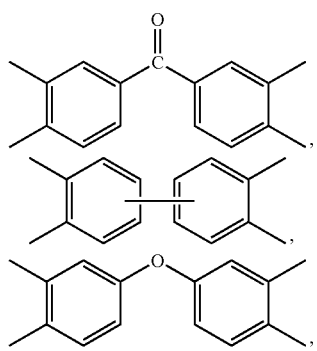

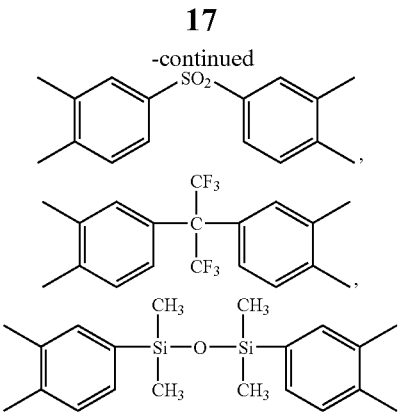

A is represented by the following formula (2),

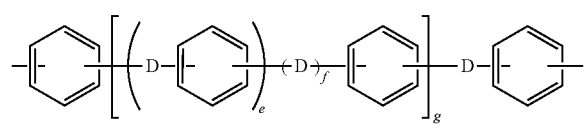

wherein D may be the same with or different from each other and is one of the following divalent groups, and

—CH$_2$—,  —O—,  —SO$_2$—,  —CONH—,

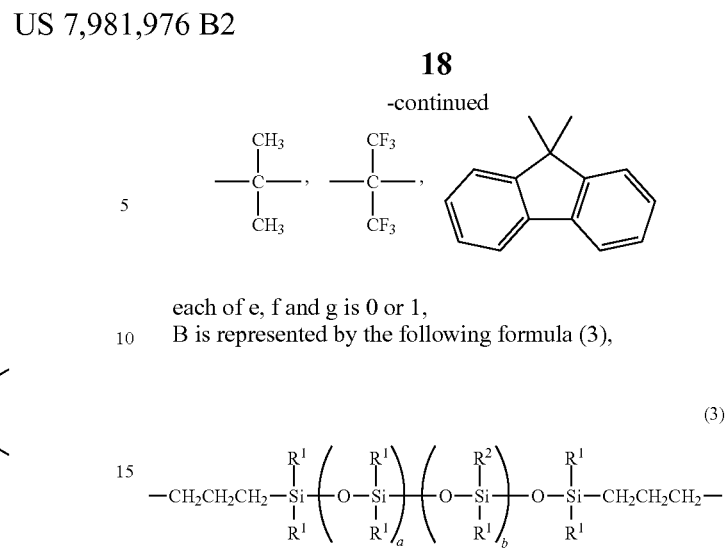

each of e, f and g is 0 or 1,
B is represented by the following formula (3), $$-CH_2CH_2CH_2-\underset{R^1}{\underset{|}{\overset{R^1}{\overset{|}{Si}}}}-\left(O-\underset{R^1}{\underset{|}{\overset{R^1}{\overset{|}{Si}}}}\right)_a\left(O-\underset{R^1}{\underset{|}{\overset{R^2}{\overset{|}{Si}}}}\right)_b O-\underset{R^1}{\underset{|}{\overset{R^1}{\overset{|}{Si}}}}-CH_2CH_2CH_2-$$

wherein $R_1$ may be the same with or different from each other and is a substituted or unsubstituted monovalent hydrocarbon group having 1 to 8 carbon atoms, $R^2$ is the radically polymerizable group, and each of a and b is an integer of from 1 to 100, and
$0 \leq k \leq 1$, and $0 < m. \leq 1$, with k+m being 1.

3. The heat-curable polyimide silicone resin composition according to claim 2, wherein $R^2$ is a vinyl group.

4. The heat-curable polyimide silicone resin composition according to claim 1, wherein the solvent is selected from the group consisting of ketone solvents, ester solvents and cellosolve solvents.

* * * * *